US008776967B2

(12) United States Patent
Øllgaard

(10) Patent No.: US 8,776,967 B2
(45) Date of Patent: Jul. 15, 2014

(54) ADJUSTABLE SUSPENSION ARRANGEMENT FOR WIND TURBINE TOWERS

(75) Inventor: Børge Øllgaard, Esbjerg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 665 days.

(21) Appl. No.: 13/057,673

(22) PCT Filed: Jul. 21, 2009

(86) PCT No.: PCT/EP2009/059368
§ 371 (c)(1),
(2), (4) Date: Apr. 27, 2011

(87) PCT Pub. No.: WO2010/015507
PCT Pub. Date: Feb. 11, 2010

(65) Prior Publication Data
US 2011/0198174 A1    Aug. 18, 2011

(30) Foreign Application Priority Data

Aug. 6, 2008 (DK) .................................. 2008 01076

(51) Int. Cl.
*F04D 29/00* (2006.01)
(52) U.S. Cl.
USPC ..................... 188/379; 416/144; 416/244 A
(58) Field of Classification Search
USPC .............. 416/144, 244 A, 244 R; 290/53–55; 188/378, 379
See application file for complete search history.

(56) References Cited

U.S. PATENT DOCUMENTS

| 6,672,837 | B1 * | 1/2004 | Veldkamp et al. ............ 416/144 |
| 2003/0147753 | A1 * | 8/2003 | Ollgaard ................... 416/244 A |

FOREIGN PATENT DOCUMENTS

| DE | 197 02 956 | 7/1998 |
| EP | 1 008 747 | 6/2000 |
| WO | 99/63219 | 12/1999 |

OTHER PUBLICATIONS

Pavlos Avramidis; International Search Report and Written Opinion issued in priority International Application No. PCT/EP2009/059368; Jul. 1, 2010; 9 pages; European Patent Office.

* cited by examiner

*Primary Examiner* — Christopher Schwartz
(74) *Attorney, Agent, or Firm* — Wood, Herron & Evans, LLP

(57) ABSTRACT

The present invention relates to a wind turbine tower suspension arrangement comprising magnetic attachment means adapted to magnetically secure the suspension arrangement to an inner surface portion of the wind turbine tower. The suspension arrangement further comprises guiding means adapted to guide an element suspended in a substantially longitudinal direction of the wind turbine tower, the guiding means being connected to the magnetic attachments means. Moreover, the present invention relates to the method for applying a wind turbine tower suspension arrangement.

20 Claims, 2 Drawing Sheets

ADJUSTABLE SUSPENSION ARRANGEMENT FOR WIND TURBINE TOWERS

FIELD OF THE INVENTION

The present invention relates to a suspension arrangement and an associated method for damping oscillations in a wind turbine tower. In particular, the present invention relates to a suspension arrangement and an associated method where the damping characteristics of the suspension arrangement can be adjusted in order to fulfil specific demands for an existing wind turbine.

BACKGROUND OF THE INVENTION

Varying damping arrangements for wind turbine towers have been suggested in the patent literature.

For example, U.S. Pat. No. 6,672,837 relates to a wind turbine with oscillation damping means provided at the nacelle. The oscillation damping means is designed for damping edgewise oscillations of the rotor blades in the rotational plane of the rotor.

In particular, the oscillation damping means suggested in U.S. Pat. No. 6,672,837 relates to a wind turbine in which the oscillation damping means are provided at the end of the nacelle, i.e. opposite the end from which the rotor extends. The damping means are designed for damping oscillations of the first fundamental frequency of the rotor blades in the rotational plane, especially oscillations being perpendicular to the rotational axis of the rotor.

EP 1 008 747 A2 relates to a damping arrangement comprising a pendulum-based damper for wind turbines. The damping arrangement suggested in EP 1 008 747 A2 is attached to the nacelle or an inner platform of the wind turbine tower. The damping arrangement is an inflexible arrangement offering no kinds of adjustments.

Also, various electrically based damping arrangements have been suggested. For example, US 2006/066111 discloses a vibration damping technique for a wind turbine system. The wind turbine system includes a vibration damper which provides a variable signal to control torque produced by a generator of the wind turbine system. The variable signal is based on generator speed and has a first local peak value based on a resonance frequency of tower side-to-side oscillation. Another electrically based damping arrangement is suggested in EP 1 045 988.

It may be seen as an object of embodiments of the present invention to provide a method and an arrangement for damping rotor blade induced oscillations in wind turbine towers.

It may be seen as a further object of embodiments of the present invention to provide an adjustable method and an associated arrangement for damping rotor blade induced oscillations of a particular oscillation frequency.

Other objects appear from the technical description and the associated figures.

DESCRIPTION OF THE INVENTION

The above-mentioned objects are complied with by providing, in a first aspect, a wind turbine tower suspension arrangement comprising magnetic attachment means adapted to magnetically secure the suspension arrangement to an inner surface portion of the wind turbine tower, the suspension arrangement further comprising guiding means adapted to guide an element suspended in a substantially longitudinal direction of the wind turbine tower, the guiding means being connected to the magnetic attachments means.

Typically, the element suspended in a substantially longitudinal direction of the wind turbine tower involves a suspension wire which at its upper end is secured to the wind turbine tower. The lower end of the suspension wire is secured to a pendulum mass structure which is allowed to oscillate/swing within the wind turbine tower. The suspension wire and the pendulum mass structure form a wind turbine damping arrangement in combination.

The fact that the suspension arrangement can be easily secures to the wind turbine tower via its magnetic attachment means facilitates that the suspension arrangement according to the present invention may be installed in already existing wind turbines. Also, due to the magnetic attachment means the suspension arrangement may be moved from one position to another position within a wind turbine tower if demands to requires. Thus, the suspension arrangement may for example be moved in the longitudinal direction of a wind turbine tower if for example the damping characteristics of a damper are to be changed.

The magnetic attachment means may comprise a number of permanent magnets. The permanent magnets may be arranged in pairs, each pair of permanent magnets being arranged on a base element. The permanent magnets may be secured to the base element using a suitable adhesive or they may be bolted to the base element. Preferably, the suspension arrangement comprises a plurality of base elements each having a pair of permanent magnets attached thereto. The plurality of base elements may be arranged on a curved trajectory in order to be able to follow the curved inner surface of a wind turbine tower.

As an alternative to permanent magnets electro-magnets may also be applicable.

The guiding means may comprise a support structure being shaped so as to receive and hold an adjustment member. The support structure may comprise an opening, said opening allowing the element suspended in the wind turbine tower to enter an interior region of the support structure. The support structure may comprise an essentially cylindrically shaped element where the before-mentioned opening takes the form of a through-going slit in said essentially cylindrically shaped element. Thus, the element suspended in the wind turbine tower is allowed to enter the interior region of the support structure via said through-going slit.

The adjustment member may be a removeably arranged adjustment member and it may comprise a through-going opening being adapted to receive the element suspended in the wind turbine tower. The through-going opening preferably takes the form of a through-going hole having a diameter being slightly larger than a diameter of the element suspended in the wind turbine tower. Thus, in case the suspended element is a suspension wire the diameter of the through-going hole in the adjustment member is just slightly larger than the diameter of the suspension wire.

In order to arrange the adjustment member around the suspended element the removeably arranged adjustment member preferably comprise first and second separable halves, each separable half comprising a recess forming one half of the through-going hole when the first and second separable halves are assembled to form the adjustment member. Thus, by forming the removeably arranged adjustment member as two separable halves the adjustment element can be easily positioned around the suspended element and subsequently positioned in the essentially cylindrically shaped element of the support structure. Each of the two separable halves may comprise a neck portion. The neck portion of each of the separable halves is adapted to rest on an upper edge of the essentially cylindrically shaped element and thus prevents that the separable halves slips through the essentially cylindrically shaped element when positioned therein. The first and second halves may be manufactured of a polymeric material, such as aramid.

The magnetic attachment means and the guiding means may be mechanically interconnected by a number of adjustable connection bars. By providing adjustable connection bars between the magnetic attachment means and the guiding, and optionally between a plurality of base elements, the distance between the magnetic attachment means and the guiding means becomes adjustable. In this way the suspension arrangement may be configured to follow essentially any curved surface, including any curved surface part within a wind turbine tower. Also, the suspension arrangement may be configured to fixate any suspended element independent of its position within the wind turbine tower.

In a second aspect the present invention relates to a method for guiding an element suspended in a substantially longitudinal direction of a wind turbine tower, the method comprising the steps of
- providing a wind turbine tower suspension arrangement comprising magnetic attachment means adapted to magnetically secure the suspension arrangement to an inner surface portion of the wind turbine tower, the suspension arrangement further comprising guiding means adapted to guide the element suspended within the wind turbine tower, the guiding means being connected to the magnetic attachments means, and
- positioning at least part of the element suspended in the wind turbine tower in an interior region of the guiding means so as to horizontally fixate the element at the position of the guiding means.

Again, the element suspended in a substantially longitudinal direction of the wind turbine tower typically involves a suspension wire which at its upper end is secured to the wind turbine tower. The lower end of the suspension wire is secured to a pendulum mass structure which is allowed to oscillate/swing within the wind turbine tower.

As previously mentioned, the magnetic attachment means of the suspension arrangement facilitates that the arrangement may be easily moved from one position to another position within a wind turbine tower. Thus, the suspension arrangement may for example be moved in the longitudinal direction of a wind turbine tower if the effective length of a suspension wire is to be changed.

The provided magnetic attachment means preferably comprises a number of permanent magnets, said permanent magnets being arranged in pairs, each pair of permanent magnets being arranged on a base element. Similarly, the provided magnetic attachment means may comprise a plurality of base elements each having a pair of permanent magnets attached thereto.

The method according to the second aspect of the present invention may further comprising the step of positioning a removeably arranged adjustment member in a cylindrically shaped support structure of the guiding means, the cylindrically shaped support structure being shaped so as to receive and hold the adjustment member. The positioned adjustment member may comprise a through-going hole having a diameter being slightly larger than a diameter of the element to be horizontally fixated. Thus, in case the suspended element is a suspension wire the diameter of the through-going hole in the adjustment member is just slightly larger than the diameter of the suspension wire.

In order to arrange the adjustment member around the suspended element the removeably arranged adjustment member preferably comprise first and second separable halves, each separable half comprising a recess forming one half of the through-going hole when the first and second separable halves are assembled to form the adjustment member. Thus, by forming the removeably arranged adjustment member as two separable halves the adjustment element can be easily positioned around the suspended element and subsequently positioned in the essentially cylindrically shaped element of the support structure. Each of the two separable halves may comprise a neck portion. The neck portion of each of the separable halves is adapted to rest on an upper edge of the essentially cylindrically shaped element and thus prevents that the separable halves slips through the essentially cylindrically shaped element when positioned therein. The first and second halves may be manufactured of a polymeric material, such as aramid.

In a third aspect the present invention relates to a method for damping oscillations of a wind turbine tower comprising a damping arrangement suspended within the wind turbine tower, the damping arrangement comprising a pendulum mass structure suspended in a suspension element, the method comprising the steps of
- providing a wind turbine tower suspension arrangement comprising magnetic attachment means adapted to magnetically secure the suspension arrangement to an inner surface portion of the wind turbine tower, the suspension arrangement further comprising guiding means adapted to guide the suspension element, the guiding means being connected to the magnetic attachments means, and
- positioning the suspension arrangement at a predetermined elevation level within the wind turbine tower and securing the suspension element in the guiding means thereby shortening an effective length of the suspension element.

The method according to the third aspect may further comprise the step of determining an oscillatory amplitude of the wind turbine tower while the wind turbine is operating. If this oscillatory amplitude exceeds an allowable value the method according to the third aspect may further comprise the step of adjusting the elevation level of the suspension arrangement in order to adjust the damping characteristic of the damping arrangement so as bring the oscillatory amplitude below the allowable level.

BRIEF DESCRIPTION OF THE DRAWINGS

The present invention will now be explained in further details with reference to the accompanying figures, wherein.

Figure 1:
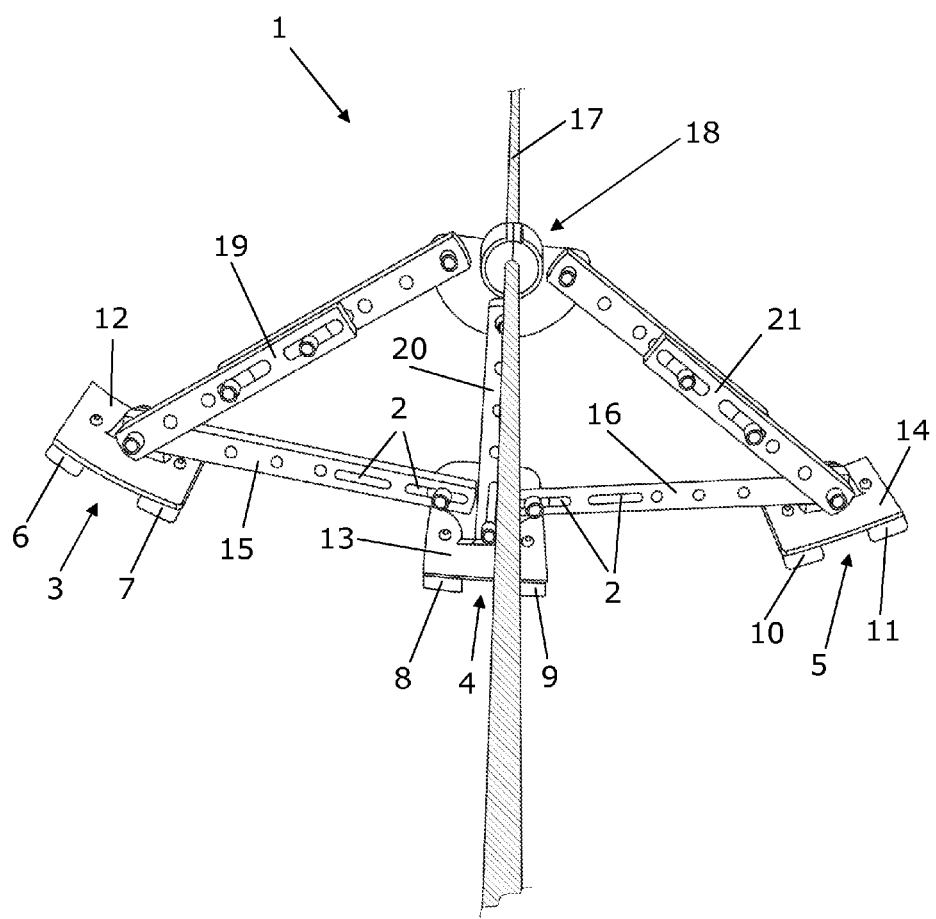
FIG. 1 shows a suspension arrangement secured to an inner surface of a wind turbine by magnetic attachment means.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

In its broadest aspect the present invention relates to suspension arrangement which can be easily moved around within a wind turbine tower. The suspension arrangement is attached to the wind turbine tower via magnets, preferably permanent magnets. The suspension arrangement is adapted to, at the vertical position of the suspension arrangement, fixate an otherwise freely moveable suspension wire. The suspension wire is suspended in the longitudinal direction of the wind turbine tower in that its upper end is attached to an upper portion of the wind turbine tower whereas its lower end is attached to a pendulum mass structure. By positioning the suspension arrangement between the upper portion of the wind turbine tower and the pendulum mass structure, and thereby horizontally fixate the suspension wire at the position of the suspension arrangement, the dynamics of the damping arrangement involving the suspended pendulum mass structure can be adjusted to fulfil specific demands.

Referring now to FIG. 1 a suspension arrangement 1 according to an embodiment of the present invention is depicted. The suspension arrangement 1 is attached to an inner surface (not shown) of a wind turbine tower via three pairs 3,4,5 of permanent magnets which keep the suspension arrangement in its desired position. The individual permanent magnets 6,7,8,9,10,11 are secured to three pivotably arranged base plates 12,13,14. The fact that the base plates 12,13,14 can pivot about respective pivot axes allows that the position and angling of the base plates can be adjusted to follow a curved surface, such as an inner surface of a wind turbine tower. Similarly, the mutual distance between the base plates 12,13,14 can be adjusted by applying connection bars 15,16 with elongated through-going openings 2.

The aim of the suspension arrangement according to the present invention is to keep a suspension wire 17 in a horizontally fixed position. To comply with this a guiding structure 18 is operatively connected to the three base plates 12,13, 14 via connection bars 19,20,21. The effective length of each of these connection bars can be varied. It should be noted that each of the connection bars 19,21 are constituted by two bars.

Figure 2:
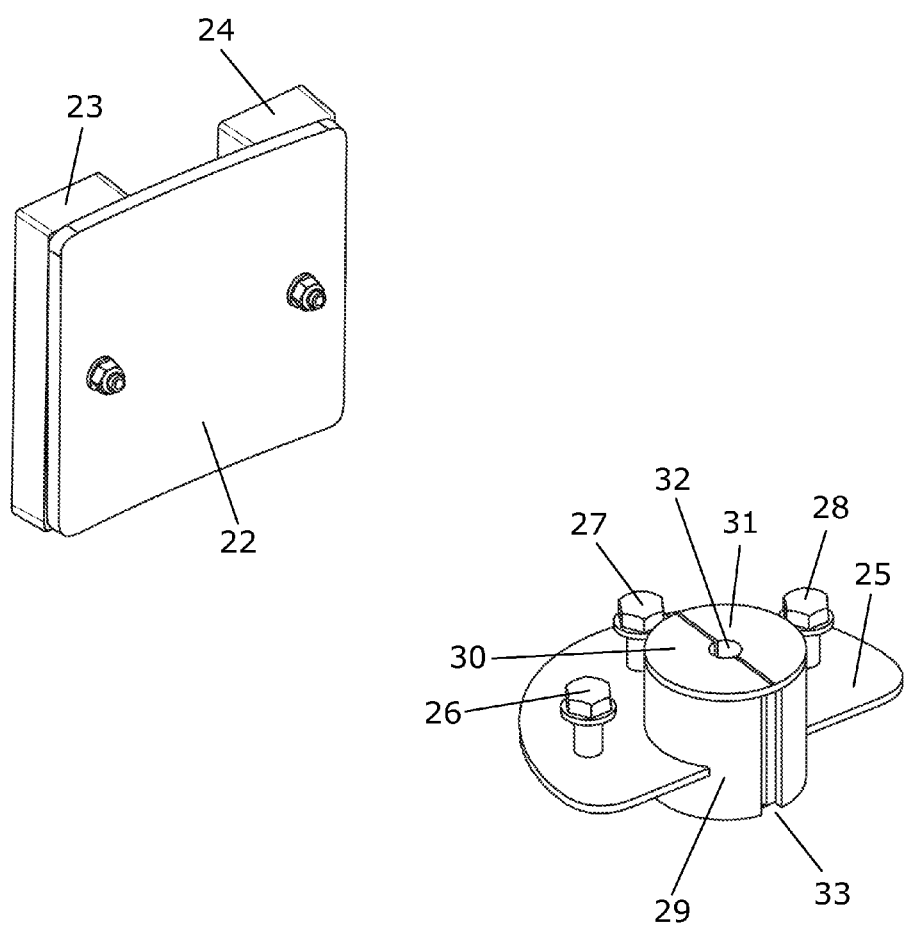
FIG. 2 shows part of a suspension arrangement having magnetic attachment means.

The guiding structure 18 is shown in greater details in FIG. 2. Moreover, FIG. 2 shows a base plate 22 having two permanent magnets 23,24 bolted thereto. The guiding structure 18 comprises an anchoring plate 25 to which connection bars 19,20,21 are secured using respective fastening bolts 26,27, 28. A cylindrically shaped structure 29 holds a pair of separable guiding elements 30,31. When positioned in the cylindrically shaped structure 29, the guiding elements 30,31 forms a through-going hole 32 within which the suspension wire 17 is intended to be positioned, cf. FIG. 1. A through-going slit 33 is provided in the cylindrically shaped structure 29. The suspension wire 17 enters the interior of the cylindrically shaped structure via said slit.

Each of the guiding elements 30,31 preferably comprises a neck portion having increased dimensions. The neck portion prevents that the guiding elements 30,31 fall through the cylindrically shaped structure 29.

The base plates, the connection bars and the guiding structure are preferably manufactured from iron. To prevent that an iron-based suspension arrangement is weakened by rust an appropriate surface treatment is often provided.

In case of a wind turbine tower having a pendulum mass structure suspended therein a suspension arrangement as depicted in FIG. 1 can be applied to damp oscillations of a particular oscillation frequency by appropriate positioning of the suspension arrangement along the suspension wire. Thus, the suspension arrangement can be applied to tune an effective length of a suspension wire in order to damp specific wind turbine tower oscillations.

The invention claimed is:

1. A constraining arrangement for laterally constraining a suspended damping arrangement suspended longitudinally within a wind turbine tower, the constraining arrangement comprising a guide through which in use a part of the suspended damping arrangement extends, a number of magnets to magnetically secure the constraining arrangement to an inner surface portion of the wind turbine tower, and a connection structure between the guide and the magnets.

2. The constraining arrangement according to claim 1, wherein the magnets comprise a number of permanent magnets.

3. The constraining arrangement according to claim 2, wherein the permanent magnets are arranged in pairs, each pair of permanent magnets being arranged on a base element.

4. The constraining arrangement according to claim 3, wherein a plurality of base elements are provided each having a pair of permanent magnets attached thereto.

5. The constraining arrangement according to claim 1, wherein the guide comprises a support structure being shaped so as to receive and hold an adjustment member.

6. The constraining arrangement according to claim 5, wherein the support structure comprises an opening, said opening allowing the part of the suspended damping arrangement to enter an interior region of the support structure.

7. The constraining arrangement according to claim 6, wherein the support structure comprises an essentially cylindrically shaped element, and wherein the opening takes the form of a through-going slit in said essentially cylindrically shaped element.

8. The constraining arrangement according to claim 5, wherein the adjustment member is removeably arranged and comprises a through-going opening being adapted to receive the part of the suspended damping arrangement.

9. The constraining arrangement according to claim 8, wherein the through-going opening takes the form of a through-going hole having a diameter being slightly larger than a diameter of the suspended damping arrangement.

10. The constraining arrangement according to claim 9, wherein the removeably arranged adjustment member comprises first and second separable halves, each separable half comprising a recess forming one half of the through-going hole when the first and second separable halves are assembled to form the adjustment member.

11. The constraining arrangement according to claim 10, wherein the first and second halves are manufactured of a polymeric material, such as aramid.

12. The constraining arrangement according to claim 1, wherein the connection structure comprises a number of adjustable connection bars whereby the distance between the magnets and the guide is adjustable.

13. A method for damping oscillations of a wind turbine tower comprising a damping arrangement suspended within the wind turbine tower, the damping arrangement comprising a pendulum mass structure suspended in a suspension element, the method comprising:
  providing a wind turbine tower suspension arrangement comprising magnetic attachment means adapted to magnetically secure the suspension arrangement to an inner surface portion of the wind turbine tower, the suspension arrangement further comprising guiding means adapted to guide the suspension element, the guiding means being connected to the magnetic attachments means, and
  positioning the suspension arrangement at a predetermined elevation level within the wind turbine tower and securing the suspension element in the guiding means thereby shortening an effective length of the suspension element.

14. The method according to claim 13, further comprising the step of determining an oscillatory amplitude of the wind turbine tower while the wind turbine is operating.

15. The method according to claim 14, further comprising the step of adjusting the elevation level of the suspension arrangement in order to adjust the damping characteristic of the damping arrangement.

16. A wind turbine tower suspension arrangement comprising a number of magnets adapted to magnetically secure the suspension arrangement to an inner surface portion of the wind turbine tower, the suspension arrangement further comprising a guide adapted to guide an element suspended in a substantially longitudinal direction of the wind turbine tower, the guide being connected to the magnets,
wherein the guide comprises a support structure being shaped so as to receive and hold an adjustment member,
wherein the support structure comprises an opening, said opening allowing the element suspended in the wind turbine tower to enter an interior region of the support structure, and
wherein the support structure comprises an essentially cylindrically shaped element, and wherein the opening takes the form of a through-going slit in said essentially cylindrically shaped element.

17. A wind turbine tower suspension arrangement comprising a number of magnets adapted to magnetically secure the suspension arrangement to an inner surface portion of the wind turbine tower, the suspension arrangement further comprising a guide adapted to guide an element suspended in a substantially longitudinal direction of the wind turbine tower, the guide being connected to the magnets,
wherein the guide comprises a support structure being shaped so as to receive and hold an adjustment member,
wherein the adjustment member is removeably arranged and comprises a through-going opening being adapted to receive the element suspended in the wind turbine tower,
wherein the through-going opening takes the form of a through-going hole having a diameter being slightly larger than a diameter of the element suspended in the wind turbine tower, and
wherein the removeably arranged adjustment member comprises first and second separable halves, each separable half comprising a recess forming one half of the through-going hole when the first and second separable halves are assembled to form the adjustment member.

18. The suspension arrangement according to claim 17, wherein the first and second halves are manufactured of a polymeric material, such as aramid.

19. A wind turbine tower suspension arrangement comprising a number of magnets adapted to magnetically secure the suspension arrangement to an inner surface portion of the wind turbine tower, the suspension arrangement further comprising a guide adapted to guide an element suspended in a substantially longitudinal direction of the wind turbine tower, the guide being connected to the magnets, and
wherein the magnets and the guide are mechanically interconnected by a number of adjustable connection bars whereby the distance between the magnets and the guide is adjustable.

20. A method for damping oscillations of a wind turbine tower comprising a damping arrangement suspended within the wind turbine tower, the damping arrangement comprising a pendulum mass structure suspended in a suspension element, the method comprising:
providing a wind turbine tower suspension arrangement comprising a number of magnets adapted to magnetically secure the suspension arrangement to an inner surface portion of the wind turbine tower, the suspension arrangement further comprising a guide adapted to guide the suspension element, the guide being connected to the magnets, and
positioning the suspension arrangement at a predetermined elevation level within the wind turbine tower and securing the suspension element in the guide thereby shortening an effective length of the suspension element.

* * * * *